UNITED STATES PATENT OFFICE.

JOSEPH LEWANDOWSKI, OF GNESEN, PRUSSIA, GERMANY.

LUBRICANT.

SPECIFICATION forming part of Letters Patent No. 423,522, dated March 18, 1890.

Application filed August 13, 1889. Serial No. 320,633. (Specimens.)

*To all whom it may concern:*

Be it known that I, JOSEPH LEWANDOWSKI, of Gnesen, Prussia, Germany, have invented an Improved Lubricant, of which the following is a specification.

This invention relates to a lubricant which not only prevents overheating, but which also serves to harden the surfaces working against each other. The lubricant should be applied while the machine is in motion.

In preparing my improved lubricant I mix the following ingredients: red or yellow prussiate of potash, forty parts; pure sulphur, sixty parts; sesquichloride of iron, four parts; rape-seed oil, about two hundred parts.

In some cases I prefer to employ the yellow prussiate of potash instead of the red prussiate, and I wish it to be understood that the one as well as the other may be used.

The method of preparing the lubricant consists in preparing, first, a complete solution of the prussiate of potash in a corresponding quantity of soft water. To this solution I add the sesquichloride of iron, and then I add to the solution the sulphur, stirring the whole mass till a uniform intimate mixture has been obtained. The mixture, being poured into a porcelain, glass, or similar receptacle, is subjected to the action of superheated steam, which is admitted to said receptacle. At the same time the mixture is continually agitated until the water is all evaporated and an absolutely-dry residue or powder remains in a finely-pulverized state. This powder is mixed by grinding with the double quantity, by weight, of best rape-seed oil till an intimate uniform mass is obtained, when the lubricant is ready for use.

The lubricant is preferably applied to the machinery while the latter is in motion and while the bearings are in a heated condition. A short time after the lubricant has been applied to the bearings (say a minute or two, depending upon the number of revolutions of the shaft) an odor of sulphur will be noticed, which arises from the evaporation of the lubricant. As soon as this odor is noticed, some petroleum should be poured upon the bearings, when the lubricating operation will be completed. The compound serves to effect an intimate and homogeneous mixture of the ingredients, as also to reduce friction. The subsequent addition of petroleum aids to suddenly cool the journals and bearings down, whereby the process of hardening the surfaces is more fully effected.

The small quantity of sesquichloride of iron serves to form Berlin blue, which colors the compound, but is not otherwise essential.

Through the hardening of the surfaces in contact the friction of these surfaces against each other is so much and so lastingly reduced that the cooling effect is rapidly and thoroughly obtained and completed by the additional pouring in of the petroleum.

The proportions of the ingredients may of course be somewhat varied. The rape-seed oil may be replaced by any other suitable oil.

What I claim is—

A lubricant consisting of prussiate of potash, sulphur, and oil, substantially as specified.

In testimony whereof I hereunto sign my name, in the presence of two subscribing witnesses, this 19th day of July, 1889.

JOSEPH LEWANDOWSKI.

Witnesses:
JOSEPH DANECKI,
BENEDYKT DANECKI.